(12) United States Patent
Tanaka et al.

(10) Patent No.: US 7,876,221 B2
(45) Date of Patent: Jan. 25, 2011

(54) SEAL HAVING AN IC TAG AND METHOD OF ATTACHING THE SAME

(75) Inventors: Masahide Tanaka, Kyoto (JP); Masataka Fujii, Kyoto (JP); Takashi Fujihara, Kyoto (JP); Toshibumi Imai, Tokyo (JP)

(73) Assignees: Suncall Corporation, Kyoto (JP); Toppan Printing Co., Ltd., Tokyo (JP); Hitachi, Ltd., Tokyo (JP)

( * ) Notice: Subject to any disclaimer, the term of this patent is extended or adjusted under 35 U.S.C. 154(b) by 1022 days.

(21) Appl. No.: 11/703,816

(22) Filed: Feb. 8, 2007

(65) Prior Publication Data

US 2007/0139205 A1 Jun. 21, 2007

Related U.S. Application Data

(63) Continuation of application No. PCT/JP2005/014529, filed on Aug. 8, 2005.

(30) Foreign Application Priority Data

Aug. 9, 2004 (JP) .............................. 2004-231978

(51) Int. Cl.
*G08B 13/14* (2006.01)
(52) U.S. Cl. ................. 340/572.1; 340/539.1; 340/571; 340/572.7; 340/572.8
(58) Field of Classification Search ............. 340/572.1, 340/539.1, 539.12, 571, 572.7, 572.8; 206/710
See application file for complete search history.

(56) References Cited

U.S. PATENT DOCUMENTS

| 6,050,622 | A | 4/2000 | Gustafson |
| 6,466,131 | B1 * | 10/2002 | Tuttle et al. ............... 340/572.7 |
| 7,017,807 | B2 * | 3/2006 | Kipp et al. .................. 235/385 |

2001/0054755 A1 12/2001 Kirkham

FOREIGN PATENT DOCUMENTS

| CN | 1280693 A | 1/2001 |
| JP | 6-511579 | 12/1994 |
| JP | 9-188331 | 7/1997 |
| JP | 2003-44809 | 2/2003 |
| JP | 2004-18003 | 1/2004 |
| JP | 2004-102353 | 4/2004 |

OTHER PUBLICATIONS

Chinese Office Action issued on Dec. 19, 2008 in corresponding Chinese Patent Application 200580027074.3.
International Search Report mailed Nov. 8, 2005 for International Application PCT/JP2005/014529 (filed Aug. 8, 2005).
English translation of International Search Report mailed Mar. 1, 2007 for International Application PCT/JP2005/014529 (filed Aug. 8, 2005).

* cited by examiner

*Primary Examiner*—Daryl Pope (57) ABSTRACT

The seal having an IC tag is to be attached to cover a bordering part between the cover and main body of a container. The seal has a base member serving as a support, an antenna provided on one surface of the base member and having a slit, an IC chip connected to the antenna and provided on the antenna, and an adhesive layer provided on that surface of the base-member on which the antenna and the IC chip are provided. The method of attaching a seal having an IC tag is to attach the antenna by using the adhesive layer, so that the seal may overlap both the cover and the main body of the container.

8 Claims, 10 Drawing Sheets

SEAL HAVING AN IC TAG AND METHOD OF ATTACHING THE SAME

CROSS REFERENCE TO RELATED APPLICATIONS

This is a Continuation Application of PCT Application No. PCT/JP2005/014529, filed Aug. 8, 2005, which was published under PCT Article 21(2) in Japanese.

This application is based upon and claims the benefit of priority from prior Japanese Patent Application No. 2004-231978, filed Aug. 9, 2004, the entire contents of which are incorporated herein by reference.

BACKGROUND OF THE INVENTION

1. Field of the Invention

The present invention relates to a seal designed to be attached to, and used on, a container with a cover and having an IC tag incorporating an RFID inlet that has an RFID IC chip and an antenna. More particularly, the invention relates to a seal having an IC tag, which is to be attached to, for example, the cap of a bottle of high-grade liquor and which serves to determine whether the bottled product is genuine or not.

2. Description of the Related Art

Hitherto, barcodes (one-dimensional barcode and two-dimensional barcodes) or seals having an IC tag have been attached to containers having a cover and used for manufacturing management. Particularly, seals having an IC tag are used in many cases because the IC tag stores a large amount of information.

A seal having an IC tag, of the type disclosed in, for example, Jpn. Pat. Appln. KOKAI Publication No. 2004-18003 may be attached to the cap of a bottle of high-grade liquor. The information read from the seal attached to the cap can be used to determine whether the bottled product is genuine or not.

BRIEF SUMMARY OF THE INVENTION

According to an aspect of the present invention, there is provided a method of attaching a seal having an IC tag to a container having a cover, the seal having an antenna having a slit and an RFID IC chip bonded to the antenna, wherein the antenna is attached partly to the cover of the container and partly to a main body of the container.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described, with reference to the accompanying drawings.

Figure 1:
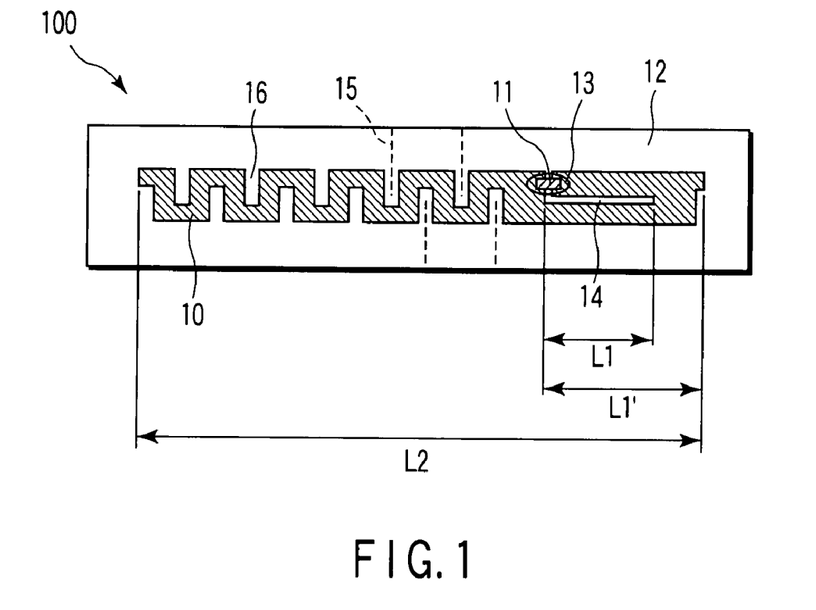
FIG. 1 is a schematic plan view showing an RFID inlet 100 to be mounted on a seal 400 which has an IC tag and which is a first embodiment of the present invention.
Figure 2:
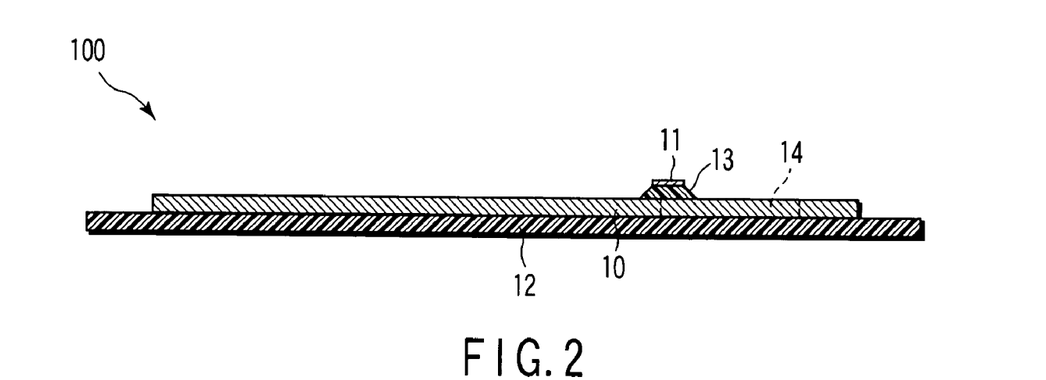
FIG. 2 is a schematic side view of the RFID inlet 100 according to the same embodiment.

FIG. 1 is a schematic plan view showing an RFID inlet 100 to be mounted on a seal 400, which has an IC, tag and which is the first embodiment of this invention. FIG. 2 is a schematic side view of the RFID inlet 100 shown in FIG. 1.

The RFID inlet 100 comprises a sheet 12 serving as a support for an antenna or the like, an antenna 10 made of a conductor such as a metal foil provided on a surface of the sheet 12, an IC chip 11 provided as an RFID on the antenna 10, and a resin mass 13 encapsulating the IC chip 11 and coupling the same with the antenna 10. Note that the RFID inlet 100 functions if provided with a ½-frequency type antenna.

Preferably, the antenna 10 is one made by etching a conductor using at least one metal such as Al, Cu, Ni, Sn, Ag or Au (typically metal foil), providing an antenna of a desired shape. Alternatively, it may be made by applying conductive ink in which particles of any metal specified above is dispersed, thus forming an antenna of a desired shape. The conductive ink may contain not only the metal particles but also carbon (C) particles, i.e., non-metal particles. In this case, the amount in which the metal is used can be reduced, lowering the cost of the antenna.

The metal strip constituting the antenna 10 meanders as viewed from above (namely, meandering in a plane). That is, the strip extends toward its open end from the IC chip 11 in the lengthwise direction. That part of the strip, which extends toward the other end, is repeatedly bent by 90°. As a result, the antenna 10 has recesses 16 which open outward and which lie alternately on the left and the right with respect to the centerline, i.e., the direction in which the antenna 10 extends. The strip constituting the antenna 10 is not limited to a meandering one. According to the present invention, the shape of the antenna is not limited to a particular one. Nonetheless, another desirable shape may be, typically, an almost rod shape as viewed in a plane (an elongated shape, e.g., a rectangle).

The antenna 10 has an overall length L2, which is based on, for example, the desired communication distance. The antenna 10 functions as a resonance-adjusting circuit over its length. Thus, the length of the antenna 10 imposes a great influence on communication characteristics. The optimal length for the antenna depends on the operating conditions. If the antenna 10 is surrounded with air, its optical length will be about half (½) wavelength for the operating frequency. If the antenna 10 is surround with dielectric material, its optimal length will be shorter because the dielectric material has effect of shortening the wavelength. If the antenna length is shorter than these values, the communication characteristics will greatly decrease. Consequently, the communication between the IC chip 11 coupled with the antenna 10 and an external IC reader or the like can no longer possible. In the present embodiment, the antenna 10 can have a length of, for example, about 20 mm to about 30 mm.

The antenna 10 has an L-shaped slit 14 in one end part (i.e., the left end part in FIG. 1). The IC chip 11 is arranged near that end of the L-shaped slit 14, which is remote from said one end part of the antenna 10.

The IC chip 11 can be μ-Chip® that is a very small IC chip manufactured Hitachi Limited. μ-Chip™ can communicate with an external IC reader or the like, at a RF frequency of about 2.45 GHz. The IC chip 11 is not limited to μ-Chip, nonetheless.

The sheet 12 comprises, for example, resin film that is shaped like a thin rectangular flat strip. Resin film such as polyimide film, polyethylene naphthalate (PEN) film or polyethylene terephthalate (PET) film can be suitably used as sheet. Alternatively, a brittle base member, such as a paper sheet, a brittle resin sheet or a brittle vinyl chloride sheet, can be suitably used. The brittle base member is preferred because it is broken, breaking the antenna, when the cover is opened. The sheet 12 may have any thickness so long as it can be used in practice; its thickness is not limited to particular values. Nonetheless, it should preferably be about 9 μm to 100 μm thick. More preferably, it should be 25 μm to 100 μm thick, in consideration of processing efficiency.

The slit 14 serves to accomplish impedance matching on the antenna characteristics. In this embodiment, the slit 14 can have an overall length L1 of about 5 mm. The distance L1' from an end of the slit to an end of the antenna 10 can be about 10 mm.

The sheet 12 has cut parts 15 (an example of easy-to-break parts). The cut parts 15 extend from one edge of the sheet 12, pass the open ends of some recesses 16 and reach the predetermined positions in regions surrounded by the recesses 16. The seal 400 having an IC tag may bridge a container 600 with a cover and a container body 620 (see FIG. 3B). In this case, the seal 400 having an IC tag is attached, with the cut parts 15 located near the border between the conductive cover 610 and the container body 620.

Preferably, the easy-to-break parts of the sheet 12 are such linear perforated parts as described above. The cut parts 15 are made by, for example, forming perforations, by making the corresponding parts of the sheet (or all sheet) brittle, or cutting V-grooves (so-called half-cuts) in the sheet. Even if the cut parts 15 do not reach the recesses 16, the sheet 12 can be easily broken at the cut parts 15.

The sheet 12 may be a brittle base member to render it easy to break the RFID inlet 100. The brittle member is, for example, a film base, a paper sheet, a vinyl chloride sheet or the like. The base member may be one that contains plasticizer. The plasticizer may be, for example, a low-molecular substance (e.g., oils or etc.). Using a base material to which such a material is added, the brittle sheet 12 is formed and can therefore be easily broken.

The 400 having an IC tag, on which the RFID inlet 100 is mounted, will be described.

Figure 3A:
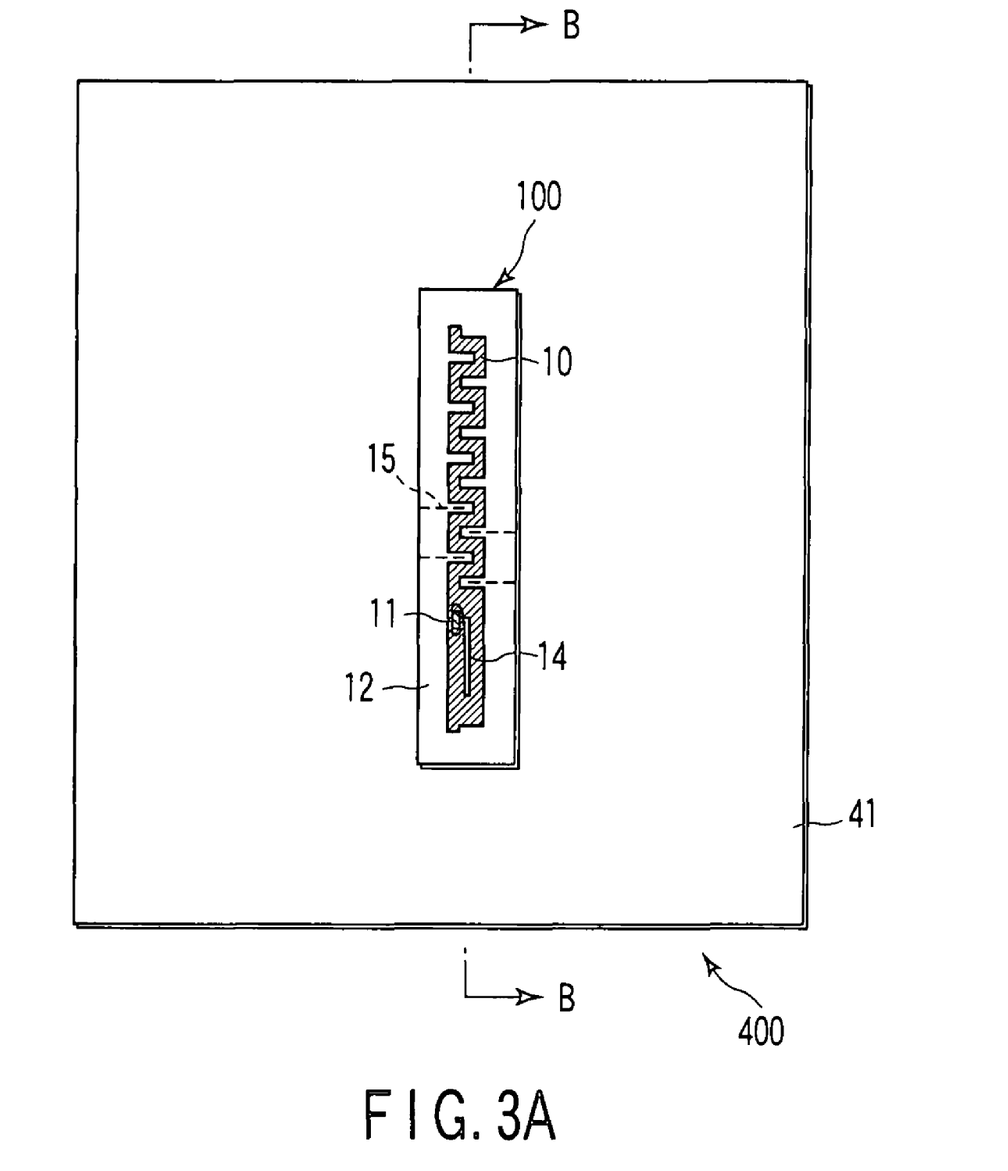
FIG. 3A is a schematic plan view showing a seal 400 having an IC tag, which is the same embodiment.
Figure 3B:
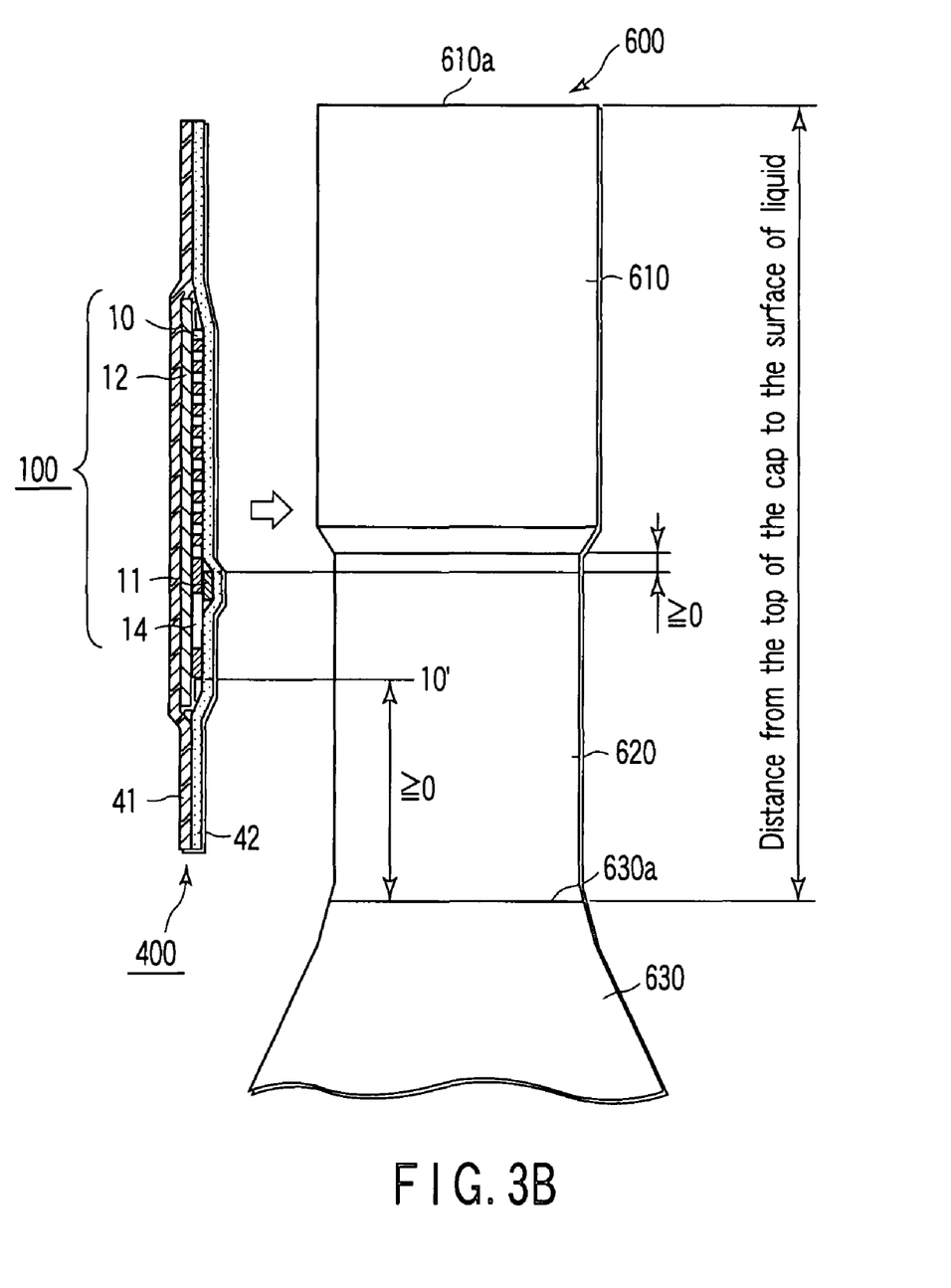
FIG. 3B is a schematic sectional view showing the seal 400 having an IC tag, according to the same embodiment, and a container 600 having a cover.

FIG. 3A is a schematic plan view showing the seal 400 having an IC tag. FIG. 3B is a schematic sectional view showing the seal 400 having an IC tag, and the container 600 having a cover.

The seal 400 having an IC tag is attached to the container 600 having a cover and is used. More precisely, it is used as a seal and pasted to the metal cap 610 on a bottle 600 (i.e., container having a cover) that contains product 630, such as high-grade liquor, thus sealing the metal cap (conductive cap) 610.

The seal 400 having an IC tag comprises a base member 41 and an RFID inlet 100. The member 41 is a paper sheet or a resin sheet. The RFID inlet 100 is secured, with adhesive, to the back of the base member 41. The remaining part of the base member 41 and the RFID inlet 100 and the RFID inlet 100 are coated with an adhesive layer 42. A trademark, an attractive figure or the like is printed, as desired or needed, on the obverse side of the base member 41. As FIG. 3A shows, the base member 41 has a simple rectangular shape. According to the present invention, the base member 41 of the seal having an IC tag need not be limited to a rectangular one. Rather, the base member can so shaped and the antenna can be so arranged that the seal having an IC tag may be attached to a container having a cover, well conforming to the three-dimensional shape of that part of the container which the seal contacts.

It is desired that the base member 41 be one that is easy to break, together with the inlet 100. The member 41 can be, for example, a sheet of high-quality paper, intermediate-quality paper sheet or groundwood paper, a brittle vinyl chloride sheet, a polyethylene resin sheet, or a synthetic paper sheet. Instead, the member 41 can be, for example, a resin film made of PET (polyethylene terephthalate), polystyrene, vinyl chloride or polypropylene. If the member 41 is a resin film, the seal 400 having an IC tag, according to this invention, can be used as so-called shrink label (also known as heat-shrinkable label). If used as a shrink label pasted partly to a bottle and partly to the cap of the bottle and then heated, the seal 400 will shrink, conforming to the three-dimensional shapes of the bottle and cap. Thus, the seal 400 having an IC tag can be attached in a desirable manner. Note that the thickness of the base member 41 is not particularly limited. Nonetheless, the base member 41 should preferably be about 80 μm to 100 μm thick if it is made of high-quality paper.

The adhesive layer 42 may be a general-purpose adhesive or a delayed tack adhesive, either used on ordinary tack labels. Instead, the layer 42 may be made of heat-sensitive adhesive that exhibits no adhesiveness at normal temperature and acquires adhesiveness when heated.

A method of bonding the seal 400 having an IC tag, to the container 600 having a cover, will be described. In this embodiment, the container 600 is a bottle which has a metal cap and which contains liquid product 630 such as high-grade liquor. The metal cap is made of electrically conductive material such as aluminum.

In the present embodiment, the seal 400 having an IC tag is attached such that the antenna 10 of the RFID inlet 100 is pasted partly to the metal cap 610 on the bottle 600 and partly to the body 620 of the bottle 600, as shown in FIG. 3B.

At this point, the antenna 10 is positioned so that the slit 14 made in the antenna 10 may not overlap the metal cap 610.

Further, the seal 400 is pasted to the bottle 600, with the lower edge of the antenna 10 located above the surface of the liquid product 630, e.g., high-grade liquor, contained in the bottle 600.

The cap 610 is made of, for example, electrically conductive material such as aluminum. The seal 400 having an IC tag is pasted to the bottle 620 so that the IC chip 11 for achieving RFID may face the bottle body 620. Thus, the IC chip 11 for achieving RFID is arranged between the bottle body 620 and the base member 41. The antenna 10 is thin and elongated as in most cases. To be pasted partly to the cover and partly to the bottle, the antenna 10 must be oriented in a specific direction, over its entire length. Therefore, the seal 400 having an IC tag is pasted to the container having a cover, to be oriented in that direction. The bottle 600 is of an ordinary-type bottle having a cover. Therefore, the cover takes the uppermost position and the neck of the bottle extends the downwards from the cover in the vertical direction. In this case, the antenna 10 is oriented in a particular direction and at a specific position on the base member 41 of each the seal 400 having an IC tag, that the antenna 10 may be arranged at a desired position and may extend in the vertical direction when the seal 400 having an IC tag is attached to the bottle.

As described above, the seal 400 having an IC tag has the RFID inlet 100 and the adhesive layer 42 on the base member 41. Therefore, the base member 41 and the adhesive layer 42 can be used to attach the RFID inlet 100 to the bottle (container having a cover).

More specifically, the seal can be pasted to a position where the antenna 10 of the RFID inlet 100 lies on both the bottle body 620 and the metal cap (conductive cover) of the bottle 600 and where the slit 14 does not overlap the metal cap 610. The seal 400 having an IC tag can therefore perform communication well if it is attached to the container 600 having a cover.

That is, if the seal 400 having an IC tag, according to this invention, is pasted so that a part of the antenna 10 provided on the seal 400 may overlap the conductive cover 610 of the container 600, the conductive cover 610 and the antenna 10 will function as an antenna. This can achieve a desired communication distance even if the antenna 10 is relatively short. Thus, the antenna 10 of the RFID inlet 100 can be shortened. If the antenna 10 is shortened, the material will be saved, reducing the manufacturing cost, and the antenna 10 will be more concealed as desired. The material of the conductive cover 610 should better be exposed at surface. Even if the cover 610 is coated and the material thereof is not exposed, almost the same advantage can be attained if the cover 610 is coated in normal way. Further, the seal 400 having an IC tag can perform communication well, because communication can be possible not only from the side of the container 600 having a cover, but also from the top of the conductive cover 610. Hence, whether the product is genuine or not can be easily determined at the inspection stage of manufacture and in the retail store.

The slit 14 can serve to perform impedance matching on the antenna characteristics. If the slit 14 does not overlap the conductive cover 610 after the seal 400 having an IC tag is attached to the container 600 having a cover, its influence on the antenna characteristics can be reduced. This enables the seal 400 to perform better communication after it is attached to the container 600 having a cover.

The slit is so shaped that the impedance may well match the IC chip used. Should the slit overlap the conductive cover 610, the actual impedance would fall out of the appropriate range due to the electric conductivity of the cover. Consequently, the wavelength used may change to an inappropriate one, and data communication with the IC chip in the IC tag cannot be well accomplished or cannot be accomplished at all.

Once the seal 400 having an IC tag has been attached to the container 600 having a cover, the antenna of the RFID inlet 100 lies partly on the conductive cover 610 and bottle body 620 of the container 600. The antenna 10 of the RFID inlet 100 mounted on the seal is therefore broken at least at one part when the cover 610 is opened. Hence, the RFID inlet 100 can no longer be used on a container that contains a fake. That is, the seal 400 having an IC tag cannot be attached to any other bottle. Hence, if the seal having an IC tag, which has a broken RFID inlet, is attached to a bottle containing a fake, the product can be accurately distinguished from the genuine product.

The seal 400 having an IC tag, according to this embodiment, has a slit 14. The IC chip 11 can be arranged over the slit 14.

The IC chip 11 for achieving RFID may be arranged to face the bottle body 620. In this case, the distance the IC chip protrudes can be shortened. The damage can therefore be reduced, which may be done to the IC chip while the container 620 having a cover is being handled. It is not rare that the cover placed on the top of the container has a recess in its lower edge. If the IC chip is well arranged in this recess, the damage will be reduced even more.

In the present embodiment, the IC chip 11 may be μ-Chip®. If this is the case, the communication frequency band can be about 2.45 GHz. The radio waves of this band (2.45 GHz) are readily absorbed in liquid. Should the antenna 10 be located at a level overlapping liquid, it could no longer transmit or receive radio waves. It is therefore desired that the antenna 10 be remote from the surface of the liquid. In view of this, it is desirable to attach the seal 400 having an IC tag be attached to a container containing a liquid product such as high-grade liquor, with the lower edge of the antenna positioned above the surface of the liquid product. Then, the antenna 10 can be remote from the level where the liquid exists in the container 600 having a cover. Thus, the antenna 10 can transmit and receive radio wave well. The metal cover 610, which functions as an antenna, can cooperate with the antenna 10, whereby radio waves can be transmitted and received well.

In the seal 400 having an IC tag, the RFID inlet 100 has easy-to-break parts 15 in the edge parts of the sheet 12. The antenna 10 of the inlet 100 can therefore be broken easily near the border between the conductive cover 610 and the container body 620 when the cap 610 is unscrewed. Once the antenna 10 is so broken, the RFID inlet can no longer be used in effect. As another measure, the RFID inlet 100 may have a brittle base member. In this case, the antenna 10 can be broken easily when the cap 610 is unscrewed. This makes it impossible, in effect, to use the RFID inlet 100 again.

That the RFID inlet cannot be used again means that no data communication is impossible because the antenna has been broken (for example, that part connected to the IC chip and lying near the slit is broken). Even if tried, the broken antenna cannot be pieced together, because the antenna has been processed at high precision. To reassemble the antenna, the IC chip must be connected to an appropriate part that lies near the slit. The possibility of reassembling success is extremely small or almost nil in practice.

Another type of a seal having an IC tag, according to the present embodiment, will be described.

Figure 4A:
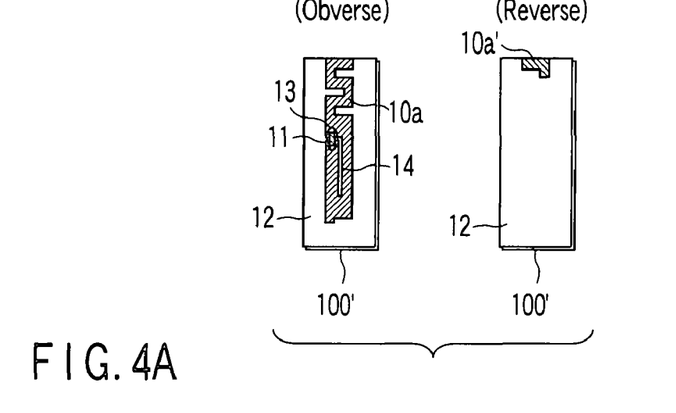
FIG. 4A is schematic plan views of an RFID inlet 100' that is provided in a seal 500 having an IC tag, according to the same embodiment.
Figure 4B:
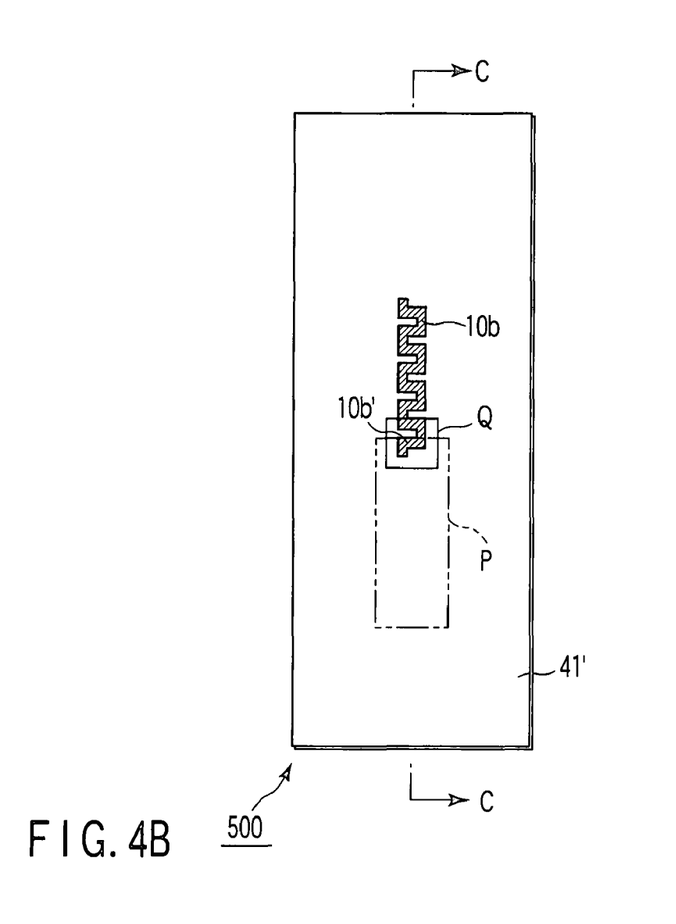
FIG. 4B is a schematic plan view of the seal part 41' of the seal 500 having an IC tag, according to the same embodiment.
Figure 4C:
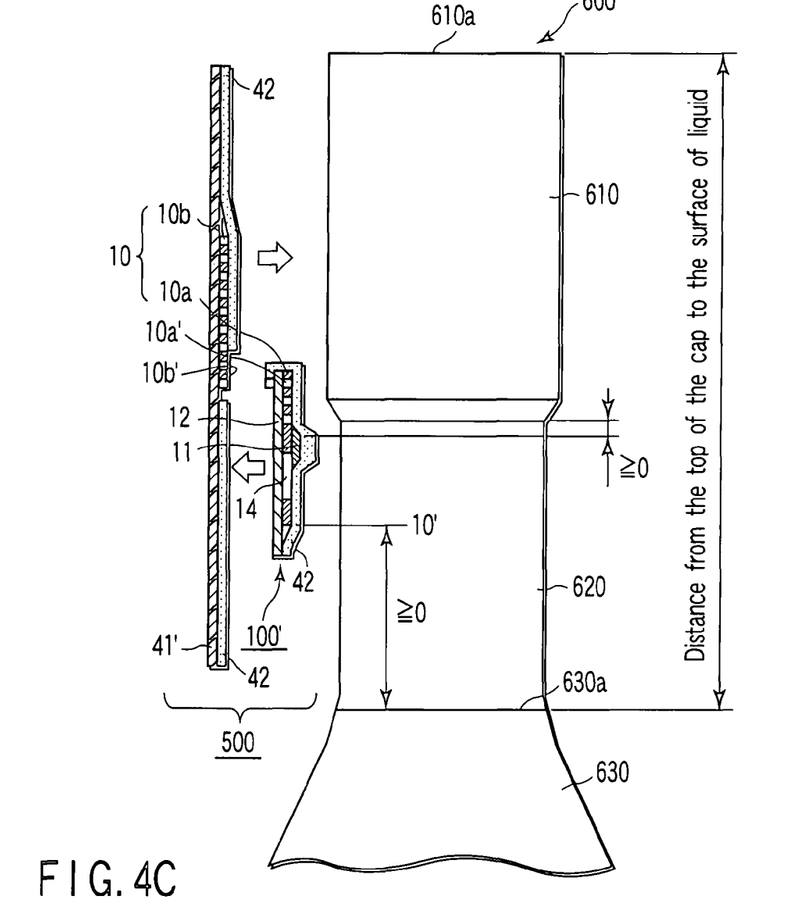
FIG. 4C is a schematic sectional view showing the seal 500 having an IC tag, according to the same embodiment, and also showing a container 600 having a cover.

FIG. 4A is schematic plan views of an RFID inlet 100' that is provided in a seal 500 having an IC tag. FIG. 4B is a schematic plan view of the seal part 41' of the seal 500 having an IC tag. FIG. 4C is a schematic sectional view showing the seal 500 having an IC tag, and also a container 600 having a cover.

The seal 500 having an IC tag will be explained. Particularly, the features that differ from those of the seal 400 shown in FIG. 3 will be explained. The components common to the seal 400 will not be described. The components essentially the same as those of the seal 400 in terms of configuration and function are designated at the same reference numbers.

Like the seal 400 having an IC tag, the seal 500 having an IC tag is used, pasted to seal the metal cap 610 of a bottle 600 that contains a liquid product 630 such as high-grade liquor.

This seal 500 with an IC tag comprises an RFID inlet 100' and a seal part 41' having a tag.

The RFID inlet 100' comprises a first antenna part 10a and an IC chip 11. The first antenna part 10a has a slit 14 and constitutes a part of the antenna 10. The IC chip 11 is connected to the first antenna part 10 and designed to achieve RFID.

More specifically, the RFID inlet 100' comprises a sheet 12 and a sealing resin mass 13, in addition to the first antenna part 10a and the IC chip 11. The strip constituting the first antenna part 10a extends toward its open end from the IC chip 11 in the lengthwise direction and has a slit 14. That part of the strip, which extends toward the other end (upper end, in FIG. 4A), is repeatedly bent by 90°. As a result, the metal strip constituting the antenna 10 meanders as viewed from above (namely, meandering in a plane as shown in FIG. 4A). The shape of the antenna is not limited to a particular one. Nonetheless, another desirable shape may be, typically, an almost rod shape as viewed in a plane (an elongated shape, e.g., an rectangle). Further, the strip is bent at the other end, onto the reverse side of the sheet 12, forming a connection part 10a'. On the reverse side of the sheet 12, the connection part 10a' is electrically connected to the connection part 10b' of a second antenna part 10b that is provided on the seal part 41' having a tag (see FIG. 4B).

The seal 41' with a tag has the second antenna part 10b, which has been made by applying electrically conductive material (for example, conductive ink), thus forming a second antenna part 10b that constitutes another part of the antenna 10 (see FIG. 4B). An adhesive layer 42 is provided on the seal 41' having a tag. The adhesive layer 42 is formed on the entire surface of the RFID inlet 100', except the part contacting the first antenna part 10a and the part surrounding this part (i.e., the part inner of Q, in FIG. 4C). In FIG. 4B, P indicates the position where the RFID inlet 100' is arranged on the seal 41' having a tag.

Figure 5A:
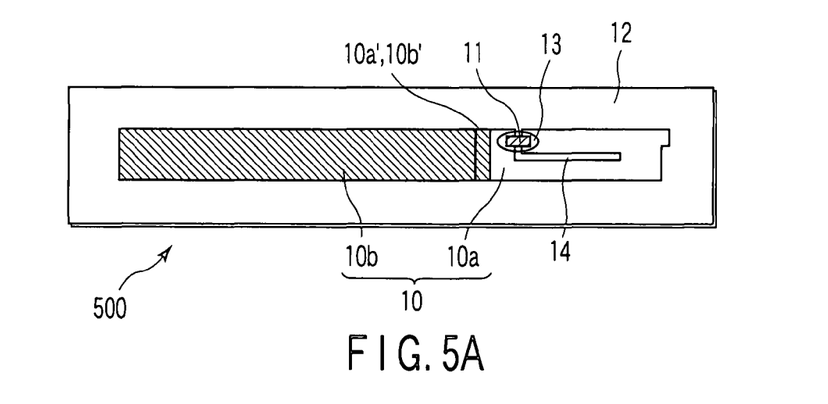
FIG. 5A is a schematic plan view of the RFID inlet 100' provided in a seal 500 having an IC tag, according to the first embodiment.
Figure 5B:
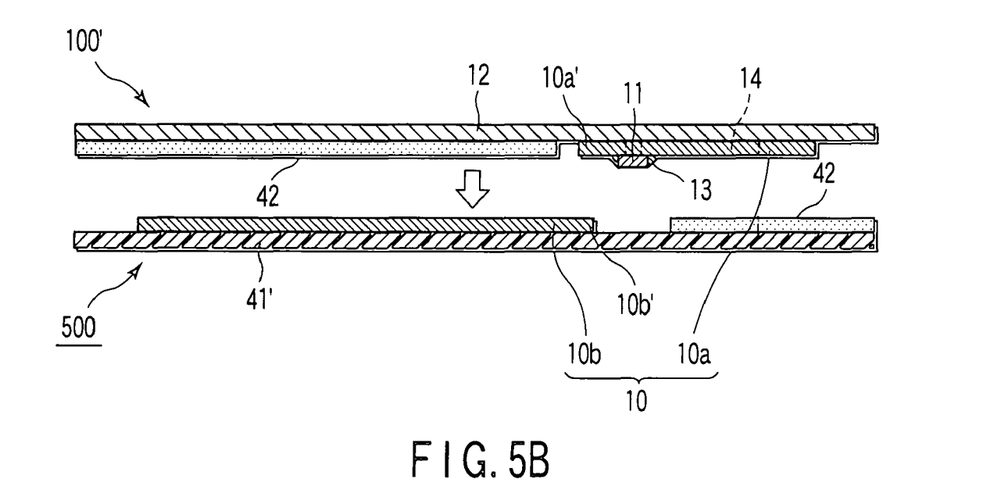
FIG. 5B is a schematic exploded side view of the RFID inlet 100' provided in the seal 500 having an IC tag, according to the same embodiment.

The seal 500 having an IC tag may be configured as shown in FIG. 5A and FIG. 5B. Namely, the RFID inlet 100' may comprises a sheet 12, a first antenna part 10a, an IC chip 11, and a resin mass 13. The sheet 12 supports, for example, the antenna. The first antenna part 10a that constitutes a part of the antenna 10 is provided on that surface of the sheet 12 which faces the seal 41' having a tag.

The strip constituting the antenna part 10a appears rectangular as viewed in a plane and extends toward its open end from the IC chip 11 in the lengthwise direction. The strip has a slit 14. A second antenna part 10b, which constitutes another part of the antenna 10, is formed on that surface of the seal 41' which faces the RFID inlet 100', by applying electrically conductive ink or the like.

The connection (junction) parts 10a' and 10b', i.e., one end (left end in FIG. 4C) of the first antenna part 10a of the RFID inlet 100', and the connection (junction) part 10b', i.e., the other end (right end in FIG. 4C) of the first antenna part 10a, can therefore be electrically connected to each other.

As shown in FIG. 5B, the adhesive layer 42 is formed on the sheet 12 and the seal 41' having a tag. Nonetheless, the adhesive layer 42 may be formed on the sheet 12 or the seal 41', or both. In whichever case, it suffices to couple, for example, the junction parts 10a' and 10b' directly in order to connect the first and second antenna parts 10a and 10b electrically. Alternatively, the first and second antenna parts 10a and 10b may be electrically connected to the junction parts 10a' and 10b', using electrically conductive material such as conductive resin.

A method of pasting the seal 500 having an IC tag to a bottle 600 having a metal cap will be described.

First, as shown in FIG. 4C, the antenna part 10a of the RFID inlet 100' is mounted, electrically connected to the antenna part 10b of the seal 41' having a tag.

Then, the antenna 10 comprising the first antenna part 10a and the second antenna part 10b is pasted, partly to the cap 610 of the bottle 600, and partly to the bottle body 620.

The antenna 10 should be pasted so that the slit 14 of the first antenna 10a may not overlap the metal cap 610. Further, the seal 500 having an IC tag is designed so that the junction part 10a' of the first antenna part 10a and the junction part 10b' of the second antenna part 10b may be positioned near the border between the metal cap 610 of the bottle 600 and the bottle body 620. Thus, the junction parts are located at the border.

The seal is pasted such that the lower edge of the antenna 10 may lie above the surface 630a of the liquid product, e.g., high-grade liquor, contained in the bottle 600.

The seal 500 having an IC tag is pasted so that the IC chip 11 for achieving RFID provided in the seal may face the bottle 620.

Figure 6A:
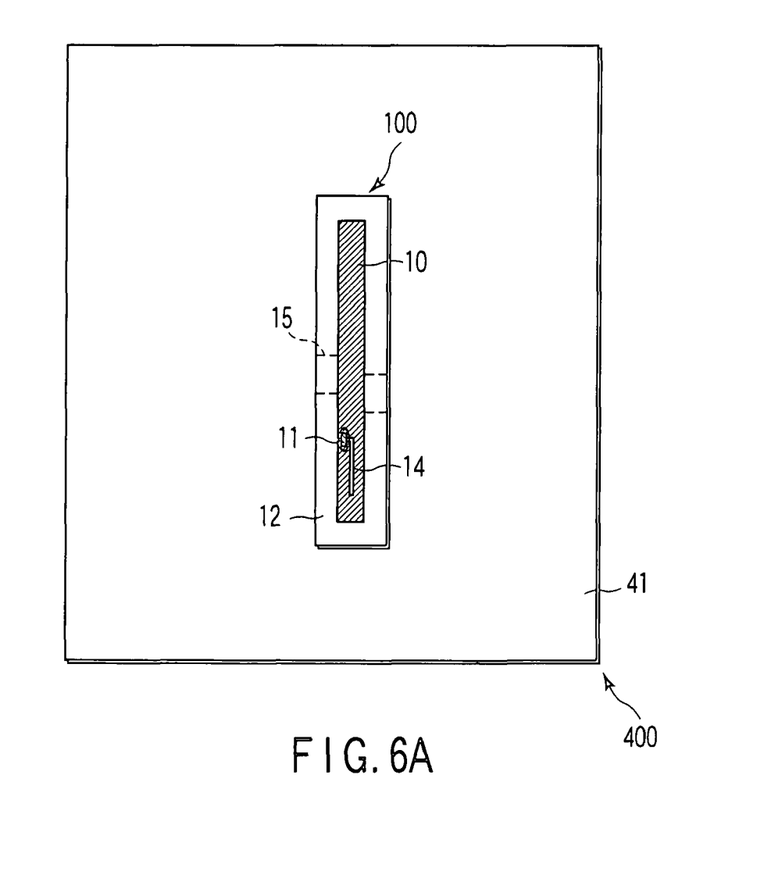
FIG. 6A is a schematic plan view of a seal 400 having an IC tag, according to the same embodiment.
Figure 6B:
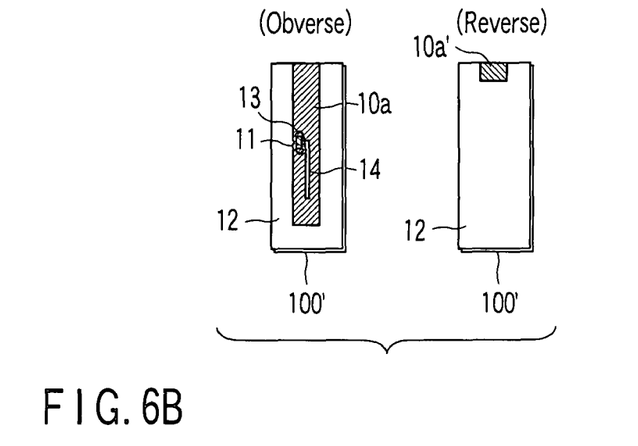
FIG. 6B is schematic plan views of the RFID inlet 100' that is provided in a seal 500 having an IC tag, according to the same embodiment.
Figure 6C:
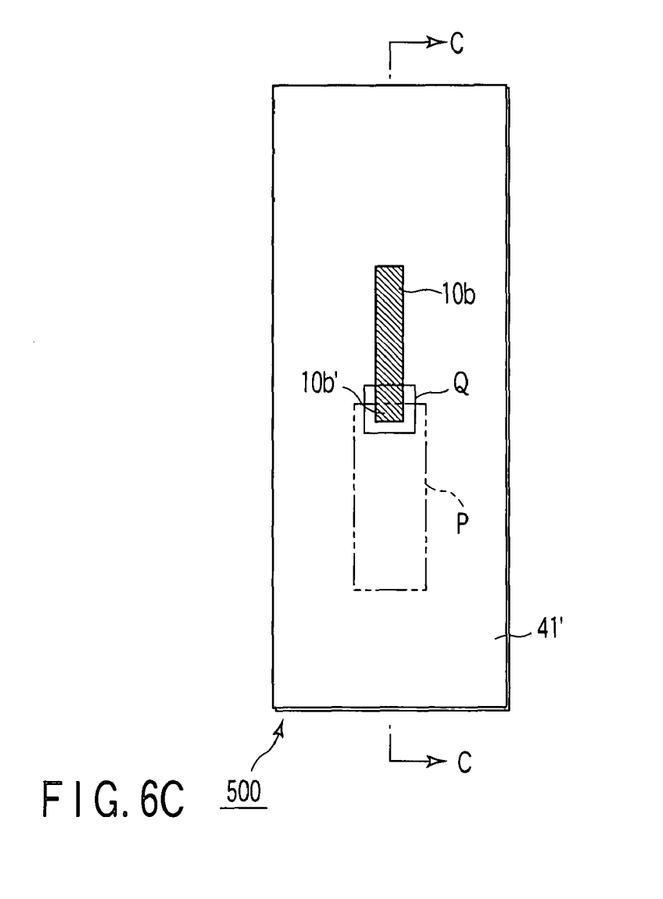
FIG. 6C is a schematic plan view of the seal part of the seal of the seal 500 having an IC tag, according to the same embodiment.

In the RFID inlet 100' of the seal 500 having an IC tag, the antenna 10 has a part that looks meandering as viewed in a plane. Instead, the part may be a rectangular one. More specifically, such a rectangular RFID inlet 100 as shown in FIG. 6A may be used. Alternatively, such an RFID inlet 100' and such a seal 500 having an IC tag, as shown in FIGS. 6B and 6C (plan views), respectively, may be used.

As has been explained, the metal cap 610 functions as an antenna after the seal 500 having an IC tag is pasted to the bottle 600. The seal 500 having an IC tag can therefore perform communication well.

Since the seal 500 having an IC tag is pasted such that the junction part 10a' of the first antenna part 10a of the RFID inlet 100' and the junction part 10b' of the second antenna part 10b of the seal 41' having a tag are positioned at the border between the metal cap 610 of the bottle 600 and the bottle body 620, the antenna parts can be more easily broken at the junction parts 10a' and 10b' than otherwise.

The second antenna part 10b formed on the seal 41' having a tag is made of electrically conductive material that is typically electrically conductive ink or the like. The antenna 10 as a whole may be made of electrically conductive ink.

The embodiment will be compared with a comparative example, thereby to describe the present invention in more detail.

The comparative example is a seal having an IC tag, which has an RFID inlet. The communication distance between the RFID inlet and the seal was measured.

Figure 8:
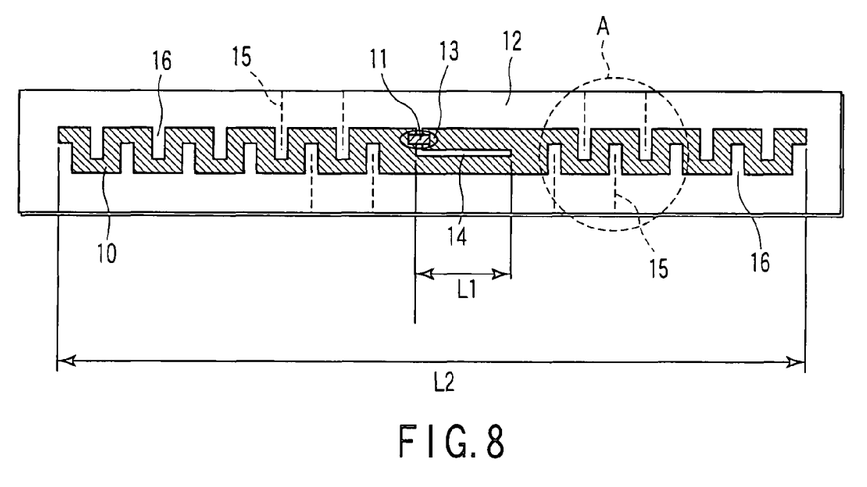
FIG. 8 is a schematic plan view of the RFID inlet used in the example compared with the embodiment.
Figure 9:
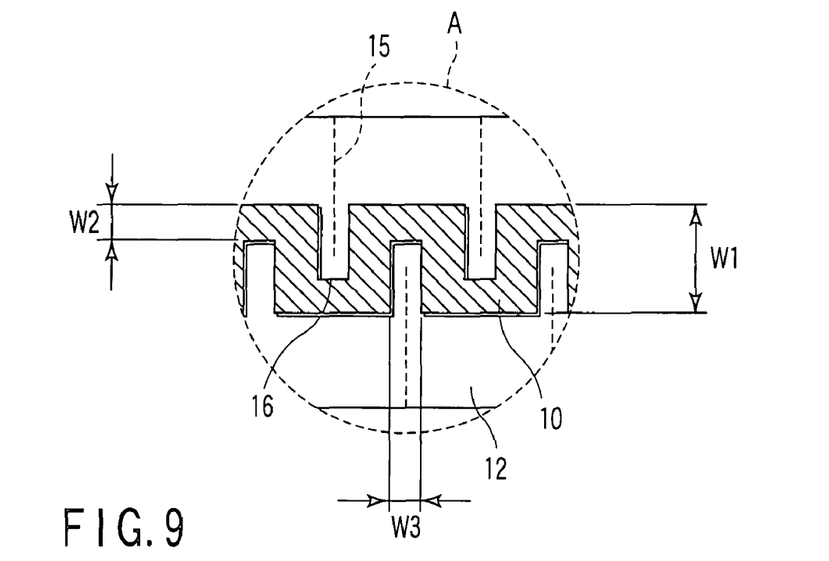
FIG. 9 is a magnified plan view of the RFID inlet used in the example compared with the embodiment.

As antenna for use in the RFID inlet, an antenna 20 μm thick was formed on a PET film that was 15 mm broad, 60 mm long and 50 μm thick. The antenna had such a shaped as is shown in FIG. 8 and FIG. 9. It had width W1 of 1.2 mm, strip width W2 of 0.4 mm, recess width W3 of 0.4 mm, slit length L1 of 10 mm, and overall antenna length L2 of 48 mm. The antenna was made, by using PET film laminated with rolled aluminum foil and by performing an etching process.

Test pieces of 19 types were prepared, which are similar to the antenna described above. They differed in overall antenna length, ranging from 48 mm to 30 mm. Each test piece has an overall antenna length one millimeter shorter than the next longer one.

An IC chip (tradename: μ-Chip, manufactured by Hitachi Ltd.) was bonded to each test pieces at an end of the slit thereof, using a commercially available sealing agent by means of ultrasonic sealing.

The sheet of each test piece was cut with a cutter, from both edges of the PET film, forming cut parts that extended into the recesses.

Figure 7:
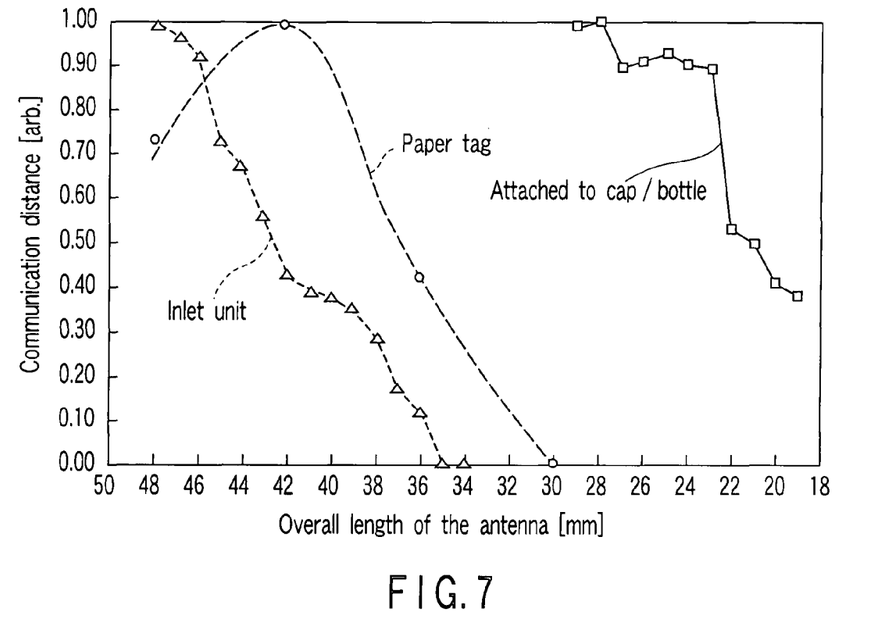
FIG. 7 is a graph representing the relation between the antenna length and the communication, observed in the embodiment, and the relation between the antenna length and the communication, observed in a comparative example.

The communication distances in the RFID inlets of the 19 types, thus made, were measured. The result was as shown in the graph of FIG. 7. In FIG. 7, the chain line shows data about "inlet unit," and the broken line shows data about "paper tag."

The term "inlet unit" means a unit that is composed of only an antenna 10 and an IC chip 11. The term "paper tag" means a unit that is composed of a paper sheet 41 and an RFID inlet 100 mounted on the paper sheet 41. Once incorporated into a paper tag, the antenna has its characteristics shifted.

In the embodiment, a seal having an IC tag was attached to a bottle having a metal cap and the communication distance was measured. The sample of the seal having an IC tag, according to this embodiment, is shaped as shown in FIG. 1, FIG. 2, FIG. 3A, FIG. 3B and FIG. 3C that show the first embodiment. The sample is substantially identical in structure to the "inlet unit" or "paper tag," except that the part on the right of the slit has been removed.

In this embodiment, seals having an IC tag were attached to bottles having a cap. Each antenna was shorter by one millimeter than the next longer one, as measured from one end. The communication distance was measured for each seal.

The result was as indicated by the solid line shown in FIG. 7, labeled "attached to cap/bottle." As FIG. 7 shows, the antennal length labeled "attached to cap/bottle" can be shorter than the "inlet unit" or and the "paper tag" to achieve the same communication distance.

The second embodiment of this invention is a genuine-fake product system that uses seals 400 having an IC tag. The components identical to those of the first embodiment will be designated at the same reference numbers and will not be described. The components of any other embodiment, which are identical to those of the first embodiment, will not be described, either.

Figure 10:
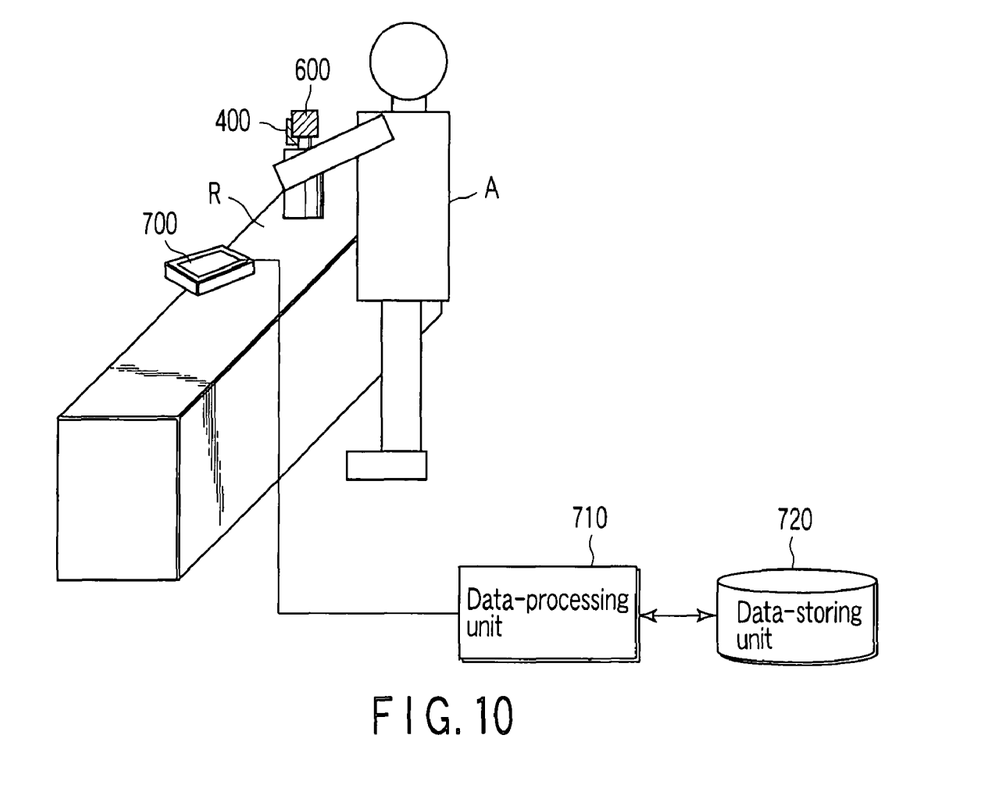
FIG. 10 is a schematic diagram showing a genuine-fake product system which is a second embodiment of the present invention.

FIG. 10 is a schematic diagram showing the genuine-fake product system that is the second embodiment of the present invention.

The genuine-fake product system comprises a seal 400 having an IC tag, an IC reader 700, a data-storing unit 710, and a data-processing unit 720. The seal 400 is pasted to a container 600 having a cover.

The seal 400 having an IC tag comprises a sheet 41, an IC chip 11, and an antenna 10. The IC chip 11 and the antenna 10 are provided on the sheet 41. The IC chip 11 stores identification data UID inherent to the IC chip 11. The IC chip 11 may be μ-Chip® manufactured by Hitachi Ltd. IC chips are available in various sizes, largely depending on design requirements. The IC chip used in this invention is not limited in size. Nonetheless, the IC chip, which is attached to a seal, should better be small enough to be inconspicuous, in view of the safeguard against forgery. If the IC chip is small, it can be well concealed. A relatively small IC chip, about 0.4 mm long and about 0.4 mm wide and relatively thin, can be exemplified. The size of the antenna is one of the major factors of the communication distance. This example achieves a communication distance of about 10 cm to about 20 cm at maximum.

The container 600 having a cover is a bottle of, for example, high-grade of liquor. It has a conductive cover 610. The seal 400 is pasted, partly to the conductive cover 610 and partly to the container body 620.

The IC reader 700 reads the UID data from the IC chip 11. The UID data read is transmitted to the data-processing unit 720.

The data-storing unit 710 stores product data. More specifically, the unit 710 stores the UID data about the IC chip 11 provided on the sheet 400 that is pasted to the bottle containing high-grade liquor. The product data can be changed in accordance with the instructions the data-processing unit 720.

The data-processing unit 720 performs a process of changing the product data stored in the data-storing unit 710. More precisely, the unit 720 receives the UID data that the IC reader 700 when the product is delivered or when the inventory is checked. Then, the unit 720 adds this UID data in the data-storing unit 710. When the product is sold, the unit 720 deletes the UID data input from the IC reader 700.

How the genuine-fake product system operates will be explained.

When the product is sold, the sales person at, for example, a cash register R uses the IC reader 700, reading the UID data from the IC chip 11 pasted to the container containing the product.

The UID data thus read is transmitted to the data-processing unit 720.

The data-processing unit 720 deletes the UID data about the product sold, from the data-storing unit 710.

Someone may open the cover of the container purchased, remove the product from the container and refill the container with a fake, in an attempt to sell the fake as genuine product. In this case, the content, if put on the market, is found to be a fake because the UID data has been deleted.

Thus, this system can deter anyone from refilling a high-grade-liquor bottle with cheaper liquor in order to sell the cheaper liquor as high-grade one.

The third embodiment of this invention is a particular RFID inlet 100 for use in the first embodiment.

Figure 11:
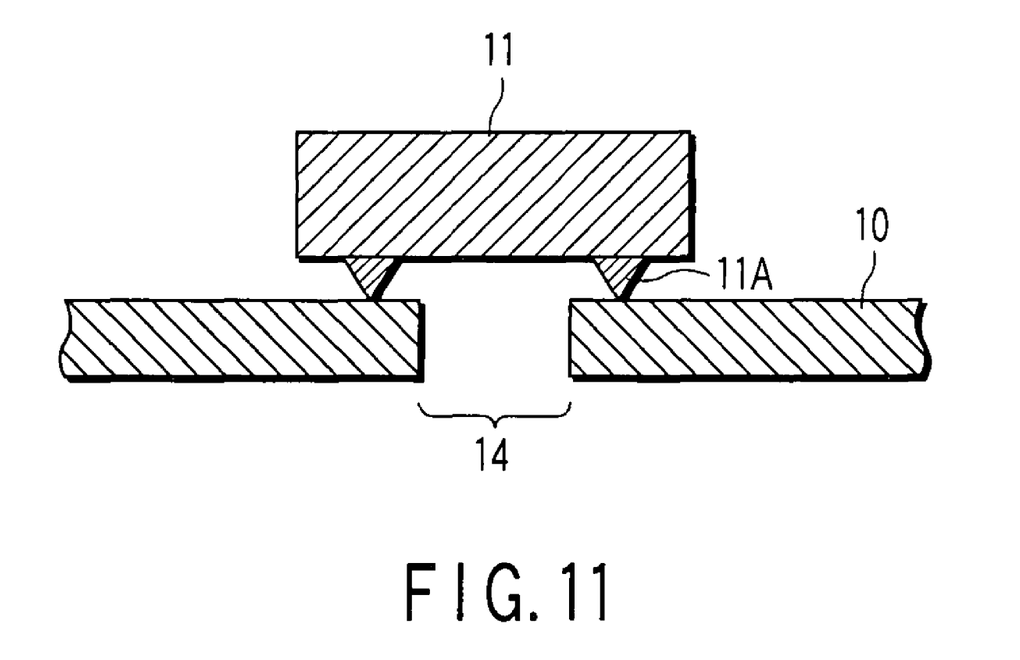
FIG. 11 is a diagram illustrating the concept of connecting an antenna 10 and an IC chip 11 in a third embodiment of the present invention.

FIG. 11 is a diagram illustrating the concept of an RFID inlet 100 according to the third embodiment of the present invention.

The antenna 10 has a slit 14. The slit 14 serves to perform impedance matching. That is, when the slit is deformed, the antenna characteristics will change. As a result, the communication distance between the IC chip attached to the antenna 10 and an external IC reader will decrease.

The IC chip 11 has bumps 11A that can be electrically connected to the antenna 10. The IC chip 11 is arranged, straddling the slit 14. Thus, the bumps 11A are electrically connected to the antenna 10, at both sides of the slit 14. The IC chip 11 can thereby communicate with an external device such as an IC reader.

The IC chip 11 is substantially identical to the IC chip of the second embodiment in terms of shape, size, communication distance, and the like.

As described above, the communication distance between the IC chip attached to the antenna 10 and an external IC reader will decrease if the slit is deformed. In view of this, the seal having an IC tag, according to the present embodiment, can be used to determine whether a product is genuine or not.

More precisely, the seal 400 having an IC tag is pasted partly to the conductive cover 610 of the container and partly to the body 620 of the container.

When the cover 610 is removed, the slit 14 is deformed. That is, the slit 14 is deformed when the seal 400 having an IC tag is removed and then attached to another container body after a fake is placed in this container body and then the cover 610 closes the container body, in an attempt to sell the fake.

Once the slit 14 has been deformed, the communication distance between the IC chip provided in the antenna 10 and an external IC reader or the like becomes much shorter. Hence, the communication with the external IC reader is no longer possible.

Thus, the product with the seal 400 having an IC tag, which cannot communicate, can be regarded as a fake. A fake, if any, having the seal 400 attached to it can be reliably distinguished from the genuine product.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of attaching a seal having an IC tag to a container having a cover, said seal having an antenna having a slit and an RFID IC chip bonded to the antenna, wherein the antenna is attached partly to the cover of the container and partly to a main body of the container, and comprising
    an RFID inlet which has a first antenna part constituting a part of the antenna and having the slit and an RFID IC chip bonded to the first antenna part, and a seal having a tag, which has a second antenna part of the antenna, other than the first antenna part and made of a predetermined electrically conductive material which is to be electrically connected to the RFID inlet, the first antenna part and the second antenna part being electrically connected, forming the antenna that is able to be attached partly to the cover of the container and partly to the main body of the container.

2. The method of attaching a seal having an IC tag, according to claim 1, wherein the seal having an IC tag is attached, with the slit not overlapping the cover of the container.

3. The method of attaching a seal having an IC tag, according to claim 1, wherein the cover of the container is an electrically conductive cover, and the seal having an IC tag is attached, with the slit not overlapping the electrically conductive cover.

4. The method of attaching a seal having an IC tag, according to claim 1, wherein the antenna is made of a metal foil or electrically conductive ink.

5. A method of attaching a seal having an IC tag to a container having a cover, the seal having an antenna element having a slit and an RFID IC chip bonded to the antenna element, the seal having an easy-to-break part, and the container containing a liquid,
    wherein the antenna element is attached partly to the cover of the container and partly to a main body of the container,
    the easy-to-break part is located at a boundary between the cover of the container and the main body of the container,
    the antenna element is located above a surface of the liquid contained in the container,
    the seal comprises
        a first antenna part constituting a part of the antenna element and having the slit,
        an RFID inlet including an RFID IC chip bonded to the first antenna part, and
        a second antenna part of the antenna element, other than the first antenna part and made of a predetermined electrically conductive material which is to be electrically connected to the RFID inlet,
    the first antenna part and the second antenna part are electrically connected to form the antenna element, and
    the antenna element is able to be attached partly to the cover of the container and partly to the main body of the container.

6. The method according to claim 5, wherein the seal is attached such that the slit does not overlap the cover of the container.

7. The method according to claim 5, wherein
    the cover comprises an electrically conductive cover, and
    the seal is attached such that the slit does not overlap the electrically conductive cover of the container.

8. The method according to claim 5, wherein the antenna element is made of a metal foil or electrically conductive ink.

* * * * *